US009094711B2

(12) United States Patent
Kawasaki

(10) Patent No.: US 9,094,711 B2
(45) Date of Patent: Jul. 28, 2015

(54) VIDEO TRANSMITTER, VIDEO TRANSMISSION METHOD, AND PROGRAM DEVICE

(71) Applicant: OLYMPUS CORPORATION, Tokyo (JP)

(72) Inventor: Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/296,909

(22) Filed: Jun. 5, 2014

(65) Prior Publication Data

US 2014/0289782 A1 Sep. 25, 2014

Related U.S. Application Data

(63) Continuation of application No. PCT/JP2012/082926, filed on Dec. 19, 2012.

(30) Foreign Application Priority Data

Dec. 21, 2011 (JP) .................................. 2011-279737

(51) Int. Cl.
*H04N 7/18* (2006.01)
*H04N 21/436* (2011.01)
*H04N 21/4363* (2011.01)
*H04N 5/38* (2006.01)

(52) U.S. Cl.
CPC ........... *H04N 21/43615* (2013.01); *H04N 5/38* (2013.01); *H04N 21/43637* (2013.01)

(58) Field of Classification Search
CPC ......................... H04N 7/106; H04N 21/43637
See application file for complete search history.

(56) References Cited

FOREIGN PATENT DOCUMENTS

| JP | 2006-54710 A | 2/2006 |
|---|---|---|
| JP | 2008-053873 A | 3/2008 |
| JP | 2009-213110 A | 9/2009 |
| JP | 2011-045103 A | 3/2011 |
| JP | 2011-130369 A | 6/2011 |
| JP | 2012-100207 A | 5/2012 |
| WO | 2007/094347 A1 | 8/2007 |

OTHER PUBLICATIONS

Japanese Notice of Allowance dated Nov. 18, 2014, issued in corresponding JP Application No. 2011-279737 with English translation (6 pages).
International Search Report dated Apr. 2, 2013, issued in corresponding application No. PCT/JP2012/082926.

*Primary Examiner* — Hunter B Lonsberry
(74) *Attorney, Agent, or Firm* — Westerman, Hattori, Daniels & Adrian, LLP

(57) ABSTRACT

A video transmitter includes: a video resolution acquisition unit that acquires a resolution of a video signal; a wireless communication unit wirelessly transmitting the video signal and wirelessly receiving, from a terminal wirelessly receiving a video signal wirelessly transmitted, a received radio wave intensity and a minimum reception sensitivity at a time when wirelessly receiving the video signal; and a communication rate setting unit that sets a communication rate at a time when wirelessly transmitting the video signal according to the acquired resolution of the video signal. The wireless communication unit includes a transmission output control unit that controls the wireless communication unit to wirelessly transmit the video signal at the communication rate set by the communication rate setting unit and controls a wireless transmission output of the wireless communication unit to suppress a difference between the radio wave intensity and the minimum reception sensitivity.

9 Claims, 12 Drawing Sheets

FIG. 4

| VIDEO BIT RATE [Mbps] | COMMUNICATION RATE [Mbps] | |
|---|---|---|
| 3000 | 4000 | 101 |
| 1500 | 2000 | 102 |
| 750 | 1000 | 103 |

FIG. 5

| COMMUNICATION RATE [Mbps] | MINIMUM RECEPTION SENSITIVITY [dBm] | |
|---|---|---|
| 4000 | −65 | 201 |
| 2000 | −70 | 202 |
| 1000 | −73 | 203 |
| 500 | −76 | 204 |

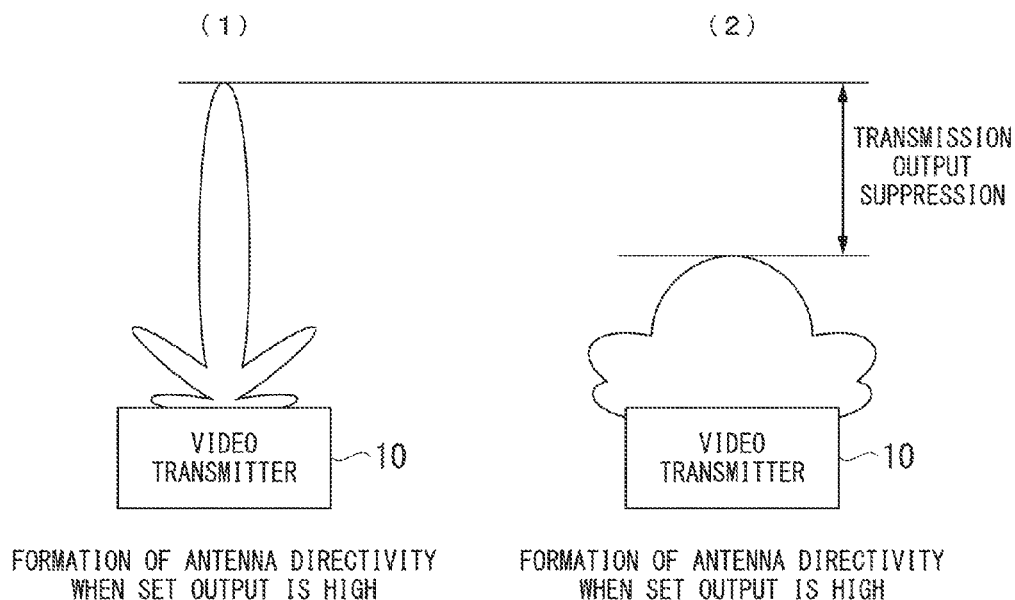

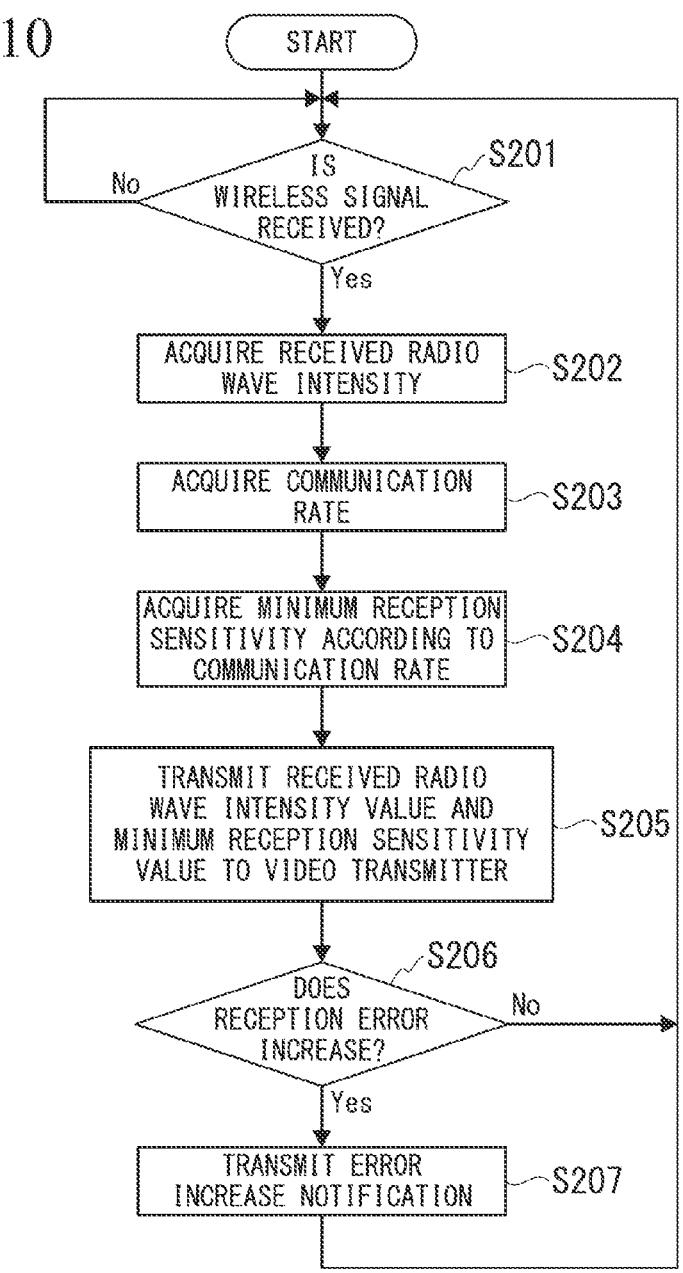

VIDEO TRANSMITTER, VIDEO TRANSMISSION METHOD, AND PROGRAM DEVICE

CROSS REFERENCE TO RELATED APPLICATIONS

This application is a continuation application based on a PCT Patent Application No. PCT/JP2012/082926, filed Dec. 19, 2012, whose priority is claimed on Japanese Patent Application No. 2011-279737, filed Dec. 21, 2011, the entire content of which are hereby incorporated by reference.

BACKGROUND OF THE INVENTION

1. Field of the Invention

The present invention relates to a video transmitter, a video transmission method, and a program.

2. Description of the Related Art

In video signal transmission systems between adjacent rooms, diverse wireless transmission systems have been introduced to reduce cables for transmitting video signals from the viewpoint of effective use of indoor spaces. FIG. 15 is a schematic diagram illustrating the constitutions of wireless communication systems in adjacent rooms. In the illustrated example, two rooms, Room 1 and Room 2, are adjacent to each other. In Room 1, CH1 is used to transmit data of a full HD video from a video transmitter Tx1 to a video receiver Rx1. Also, CH2 is used to transmit data of a full HD video from a video transmitter Tx2 to a video receiver Rx2. In Room 2, CH1 is used to transmit data of an SD video from a video transmitter Tx3 to a video receiver Rx3.

As illustrated, when a plurality of rooms are adjacent to each other, communication is assumed to be performed using the same wireless channel in the plurality of rooms. Depending on the material qualities of walls or the like partitioning the rooms or the frequencies of radio waves, there is a possibility of the radio waves of one wireless system penetrating through the walls and interfering with other wireless systems. In particular, when a video signal with a high resolution such as a full HD video is wirelessly transmitted in real time, a communication rate is generally high, and thus an S/N ratio decreases and is weakened by interference.

In the illustrated example, a system including the video transmitter Tx1 and the video receiver Rx1 wirelessly transmits the full HD video using CH1 in Room 1. Also, a system including the video transmitter Tx3 and the video receiver Rx3 wirelessly transmits the SD video using CH1 in Room 2. Therefore, the system including the video transmitter Tx1 and the video receiver Rx1 receives the interference from the system including the video transmitter Tx3 and the video receiver Rx3. The fact that the transmission output level of the system including the video transmitter Tx1 and the video receiver Rx1 is the same as the transmission output level of the system including the video transmitter Tx3 and the video receiver Rx3 can be exemplified as a reason for this.

As a method of avoiding the interference, there is a method of lowering the transmission output of a video transmitter in addition to a method of changing a channel (changing a frequency) to be used for communication by each system. However, when the transmission output of a video receiver is simply lowered, there is a fear of the transmission output not reaching a signal level at which the video receiver may receive a signal, thereby having a considerable influence on communication quality. Also, the interference can be considered to be suppressed by changing a communication rate of the system including the video transmitter Tx3 and the video receiver Rx3 so that the communication rate is the same as a communication rate of the system including the video transmitter Tx1 and the video receiver Rx1 and by shortening a communication time of the system including the video transmitter Tx3 and the video receiver Rx3. However, as described above, when the communication rate is set to be high, the communication rate is weakened by interference. Therefore, there is a fear of the system including the video transmitter Tx3 and the video receiver Rx3 receiving the interference from the system including the video transmitter Tx1 and the video receiver Rx1.

Also, a technology for ensuring suitable communication quality by switching the number of antennas used for wireless communication based on a communication rate and an S/N ratio and effectively utilizing antenna resources is known (for example, see Japanese Unexamined Patent Application, First Publication No. 2006-54710). According to this technology, it is possible to suppress excessive transmission power when a video transmitter transmits a signal.

SUMMARY

According to a first aspect of the present invention, there is provided a video transmitter including: a video resolution acquisition unit configured to acquire a resolution of a video signal; a wireless communication unit configured to include an antenna and to wirelessly transmit the video signal and wirelessly receive, from a terminal having wirelessly received the wirelessly transmitted video signal, a received radio wave intensity and minimum reception sensitivity at a time of the wireless reception of the video signal; and a communication rate setting unit configured to set a communication rate at a time of the wireless transmission of the video signal according to the acquired resolution of the video signal. The wireless communication unit includes a transmission output control unit configured to perform control such that the wireless communication unit wirelessly transmits the video signal at the communication rate set by the communication rate setting unit and to perform control such that a wireless transmission output of the wireless communication unit is suppressed to suppress a difference between the received radio wave intensity and the minimum reception sensitivity wirelessly received by the wireless communication unit when the set communication rate is less than a first predetermined value and the difference is equal to or greater than a second predetermined value.

According to a second aspect of the present invention, in the video transmitter related to the first aspect of the present invention, the transmission output control unit may suppress the wireless transmission output by changing directivity of the antenna.

According to a third aspect of the present invention, in the video transmitter related to the first or second aspect of the present invention, the transmission output control unit may suppress the wireless transmission output by controlling a signal level supplied to the antenna.

According to a fourth aspect of the present invention, in the video transmitter related to any one of the first to third aspects of the present invention may further include: an interference wave detection unit configured to detect whether there is an interference wave interfering with wireless communication with the terminal; an arrival direction estimation unit configured to estimate an arrival direction of the interference wave detected by the interference wave detection unit; and a beam forming unit configured to form a null point of directivity of the antenna in the arrival direction estimated by the arrival direction estimation unit.

According to a fifth aspect of the present invention, in the video transmitter related to any one of the first to fourth aspects of the present invention, the transmission output control unit may suppress the wireless transmission output during a vertical synchronization period of the wirelessly transmitted video signal.

According to a sixth aspect of the present invention, in the video transmitter related to any one of the first to fifth aspects of the present invention, the transmission output control unit may suppress the wireless transmission output at a time of wireless transmission of a control signal.

According to a seventh aspect of the present invention, in the video transmitter related to the sixth aspect of the present invention, the antenna may be an array antenna, and the transmission output control unit may suppress the wireless transmission output at a time of wireless transmission of a signal regarding control of the array antenna to the terminal.

According to an eighth aspect of the present invention, there is provided a video transmission method including: a video resolution acquisition step of acquiring a resolution of a video signal; a wireless communication step of wirelessly transmitting the video signal and wirelessly receiving, from a terminal having wirelessly received the wirelessly transmitted video signal, a received radio wave intensity and minimum reception sensitivity at a time of the wireless reception of the video signal; a communication rate setting step of setting a communication rate at a time of the wireless transmission of the video signal according to the acquired resolution of the video signal; and a transmission output control step of performing control such that a wireless communication unit wirelessly transmits the video signal at the communication rate set in the communication rate setting step and performing control such that a wireless transmission output of the wireless communication unit is suppressed to suppress a difference between the received radio wave intensity and the minimum reception sensitivity wirelessly received in the wireless communication step when the set communication rate is less than a first predetermined value and the difference is equal to or greater than a second predetermined value.

According to a ninth aspect of the present invention, there is provided a program device that stores a program causing a computer to perform: a video resolution acquisition step of acquiring a resolution of a video signal; a wireless communication step of wirelessly transmitting the video signal and wirelessly receiving, from a terminal having wirelessly received the wirelessly transmitted video signal, a received radio wave intensity and minimum reception sensitivity at a time of the wireless reception of the video signal; a communication rate setting step of setting a communication rate at a time of the wireless transmission of the video signal according to the acquired resolution of the video signal; and a transmission output control step of performing control such that a wireless communication unit wirelessly transmits the video signal at the communication rate set in the communication rate setting step and performing control such that a wireless transmission output of the wireless communication unit is suppressed to suppress a difference between the received radio wave intensity and the minimum reception sensitivity wirelessly received in the wireless communication step when the set communication rate is less than a first predetermined value and the difference is equal to or greater than a second predetermined value.

BRIEF DESCRIPTION OF THE DRAWINGS

FIG. 4 is a schematic diagram illustrating a data structure of a communication rate table according to the first embodiment of the present invention.

FIG. 5 is a schematic diagram illustrating a data structure of a minimum reception sensitivity table according to the first embodiment of the present invention.

FIG. 7 is a schematic diagram illustrating a relation between directivity of the antenna unit and a transmission output according to the first embodiment of the present invention.

FIG. 8 is a schematic diagram illustrating a data structure of an antenna gain suppression table according to the first embodiment of the present invention.

FIG. 10 is a flowchart illustrating an order in which the video receiver receives the video signal wirelessly transmitted from the video transmitter according to the first embodiment of the present invention.

FIG. 11 is a schematic diagram illustrating a data structure of a minimum reception sensitivity table of a control signal according to a second embodiment of the present invention.

DETAILED DESCRIPTION OF THE PREFERRED EMBODIMENTS

First Embodiment

Figure 1:
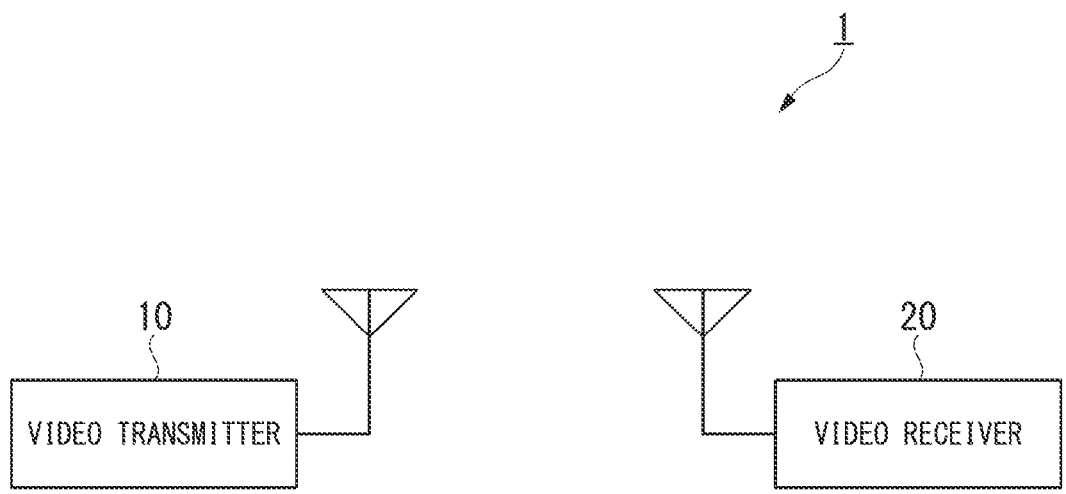
FIG. 1 is a schematic diagram illustrating the constitution of a video transceiver system according to a first embodiment of the present invention.

Hereinafter, a first embodiment of the present invention will be described with reference to the drawings. FIG. 1 is a schematic diagram illustrating the constitution of a video transceiver system according to the present embodiment. A video transceiver system 1 includes a video transmitter 10 and a video receiver 20. The video transmitter 10 acquires a video signal and transmits the acquired video signal to the video receiver 20 which is a connection destination. The video receiver 20 receives the video signal transmitted from the video transmitter 10 and displays a video based on the received video signal on a monitor or the like. Wireless communication is performed in a communication path between the video transmitter 10 and the video receiver 20.

Figure 2:
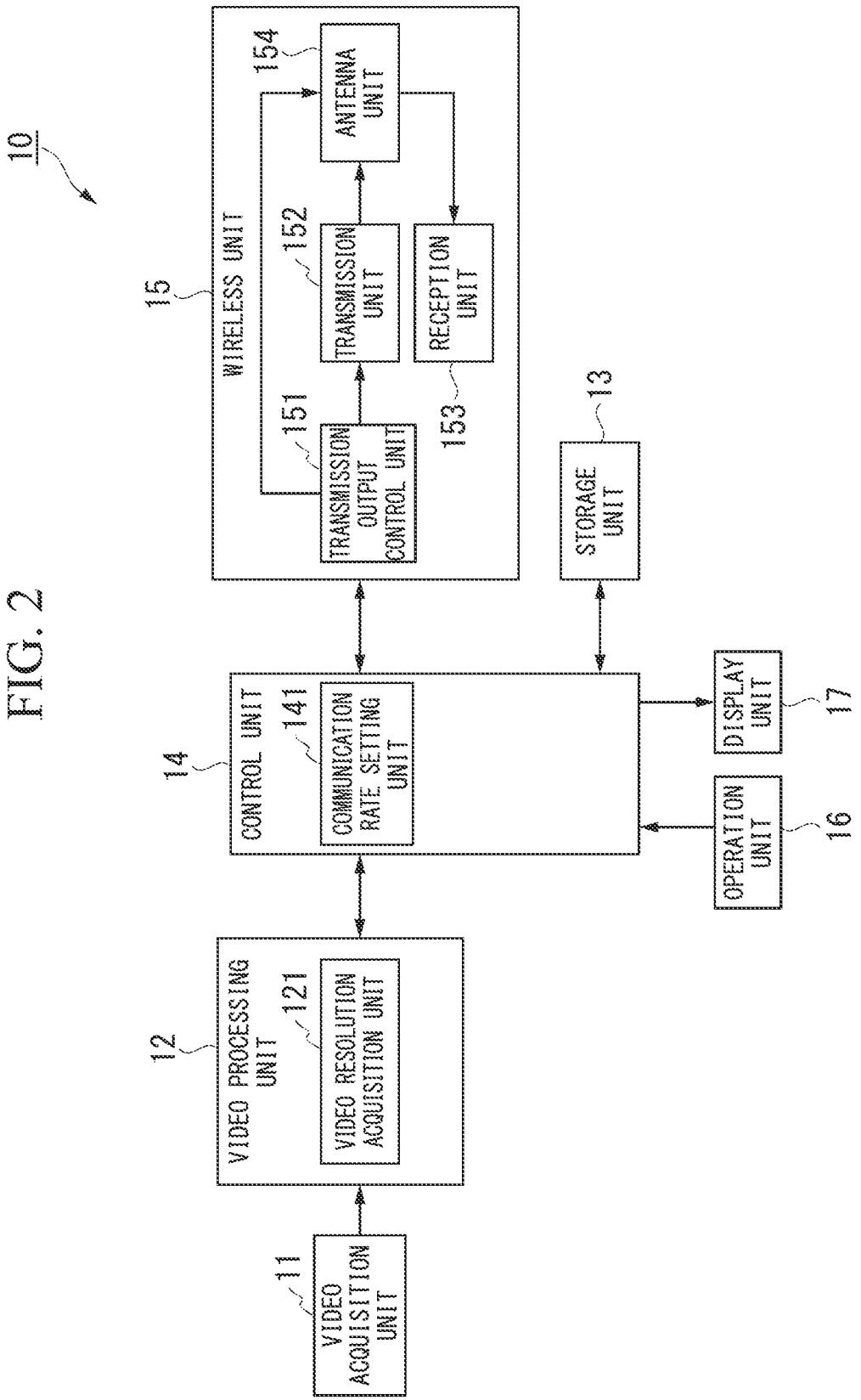
FIG. 2 is a block diagram illustrating the constitution of a video transmitter according to the first embodiment of the present invention.

Next, the constitution of the video transmitter 10 will be described. FIG. 2 is a block diagram illustrating the constitution of the video transmitter 10 according to the present embodiment. In the illustrated example, the video transmitter 10 includes a video acquisition unit 11, a video processing unit 12, a storage unit 13, a control unit 14, a wireless unit 15 (wireless communication unit), an operation unit 16, and a display unit 17. Also, the video processing unit 12 includes a video resolution acquisition unit 121. Also, the control unit 14 includes a communication rate setting unit 141. Also, the wireless unit 15 includes a transmission output control unit 151, a transmission unit 152, a reception unit 153, and an antenna unit 154. The essential constitution of the present embodiment includes the video resolution acquisition unit 121 of the video processing unit 12, the communication rate setting unit 141 of the control unit 14, and the wireless unit 15 (including the transmission output control unit 151).

The video acquisition unit 11 acquires the video signal to be transmitted to the video receiver 20 illustrated in FIG. 1. For example, the video acquisition unit 11 acquires a video signal from another apparatus. The video processing unit 12 processes the video signal acquired by the video acquisition unit 11. The video resolution acquisition unit 121 acquires the resolution of the video signal acquired by the video acquisition unit 11. The storage unit 13 stores a program or various kinds of data.

The control unit 14 controls each of the units included in the video transmitter 10. The communication rate setting unit 141 sets a communication rate when the video signal is transmitted to the video receiver 20. A method of setting the communication rate will be described later.

The wireless unit 15 transmits and receives a video signal, a control signal, and the like to and from the video receiver 20 illustrated in FIG. 1 by establishing connection of wireless communication. The transmission output control unit 151 controls a transmission output of the transmission unit 152. The transmission unit 152 transmits a wireless signal to the video receiver 20 illustrated in FIG. 1. The reception unit 153 receives a wireless signal transmitted from the video receiver 20 illustrated in FIG. 1.

The antenna unit 154 is, for example, an adaptive array antenna using a plurality of antenna elements and suppresses the transmission output by decreasing an antenna gain. In the present embodiment, the antenna gain is decreased by changing directional characteristics of the adaptive array antenna. Since the details of a method of changing the antenna directional characteristics by the adaptive array antenna are known, the details of the method are omitted. In brief, this method is a method of controlling directivity (beam forming) emitted from the antenna unit 154 by adaptively controlling the phase and amplitude of a wireless signal input to each antenna element. The operation unit 16 includes a button or/and a lever operable by a user and receives an input of an instruction from the user. The display unit 17 displays various statuses and the like.

Figure 3:
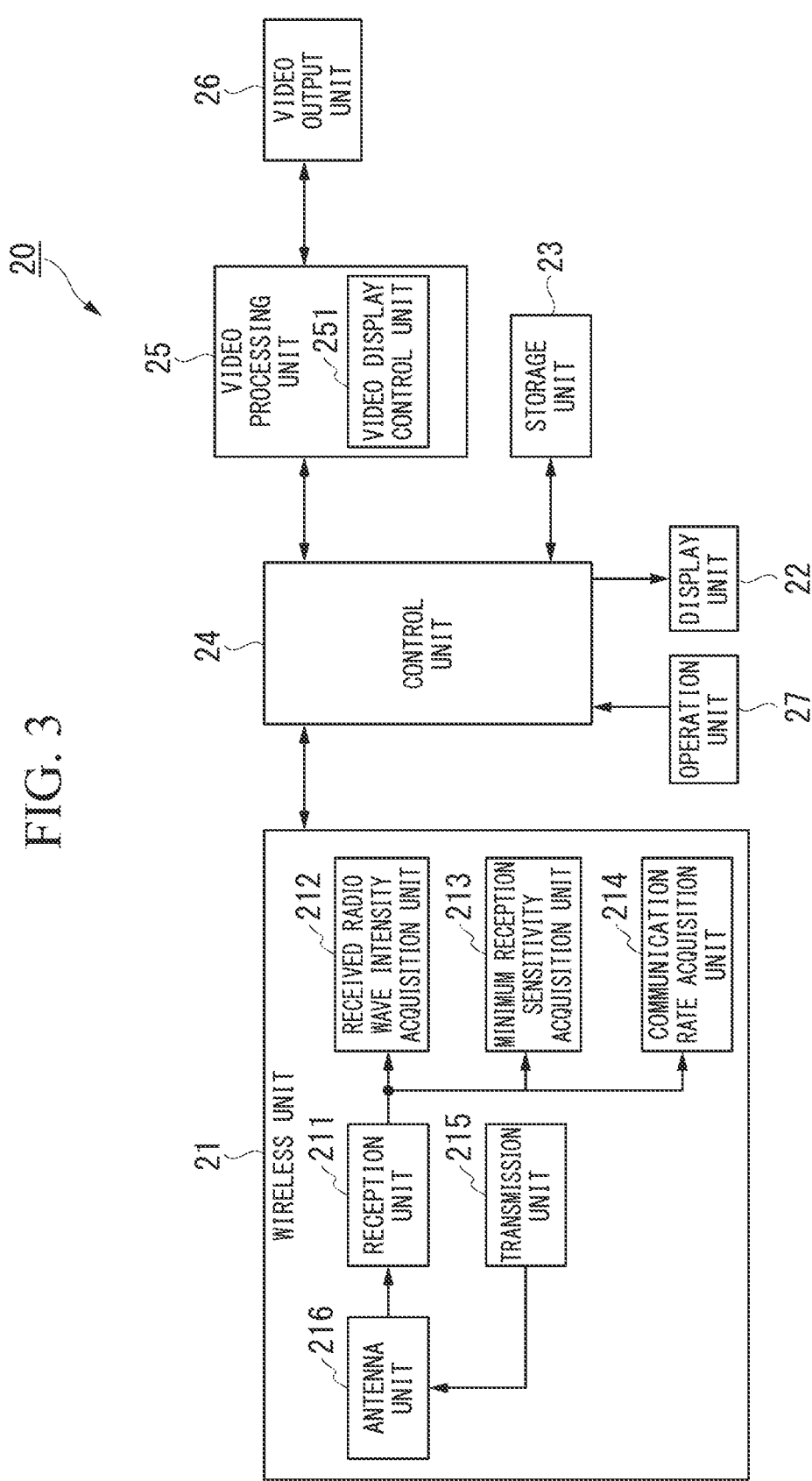
FIG. 3 is a block diagram illustrating the constitution of a video receiver according to the first embodiment of the present invention.

Next, the constitution of the video receiver 20 will be described. FIG. 3 is a block diagram illustrating the constitution of the video receiver 20 according to the present embodiment. In the illustrated example, the video receiver 20 includes a wireless unit 21, a display unit 22, a storage unit 23, a control unit 24, a video processing unit 25, a video output unit 26, and an operation unit 27. Also, the wireless unit 21 includes a reception unit 211, a received radio wave intensity acquisition unit 212, a minimum reception sensitivity acquisition unit 213, a communication rate acquisition unit 214, a transmission unit 215, and an antenna unit 216. Also, the video processing unit 25 includes a video display control unit 251.

The wireless unit 21 transmits and receives a video signal, a control signal, and the like to and from the video transmitter 10 illustrated in FIG. 2 by establishing connection of wireless communication. The reception unit 211 receives a wireless signal transmitted from the video transmitter 10 illustrated in FIG. 2. The received radio wave intensity acquisition unit 212 acquires a radio wave intensity of the wireless signal received by the reception unit 211. The minimum reception sensitivity acquisition unit 213 acquires the minimum reception sensitivity by which the wireless signal can be received. The communication rate acquisition unit 214 acquires a communication rate of the wireless signal. The transmission unit 215 transmits a signal to the video transmitter 10 illustrated in FIG. 2. The antenna unit 216 is, for example, an adaptive array antenna using a plurality of antenna elements and can change directivity.

The display unit 22 displays various statuses and the like. The storage unit 23 stores a program or various kinds of data such as wireless setting information. The control unit 24 controls each of the units included in the video receiver 20. The video processing unit 25 performs video processing on a video signal included in the wireless signal received by the reception unit 211. The video display control unit 251 controls the video signal to be output to the video output unit 26. The video output unit 26 outputs the video signal subjected to the video processing by the video processing unit 25. The operation unit 27 includes a button or/and a lever operable by a user and receives an input of an instruction from the user.

Next, a communication rate table stored by the storage unit 13 of the video transmitter 10 will be described. FIG. 4 is a schematic diagram illustrating a data structure of the communication rate table according to the present embodiment. The communication rate table has data items "video bit rate" and "communication rate," and pieces of data of the data items are stored for each row in association therewith.

In the data item "video bit rate," bit rates of the video signal transmitted by the video transmitter 10 are stored. In the data item "communication rate," communication rates necessary for wirelessly transmitting the video signal with the bit rate stored in the data item "video bit rate" to the video receiver 20 are stored. The units of the video bit rate and the communication rate are "Mbps".

In the communication rate table, the minimum communication rate at which the video signal can be wirelessly transmitted in real time is stored in advance. That is, the low value of the bit rate of the video signal is stored in association with the value of a low communication rate. For example, the communication rate of about 1.5 Gbps is necessary as the minimum rate to wirelessly transmit a non-compressed video signal (an image size: 1920×1080 pixels, the number of frames per second: 60 frames, interlace, and the number of bits per pixel: 8 bits, RGB format) of 1920×1080 60i. When three methods, 4 Gbps, 2 Gbps, and 1 Gbps, are options of the communication rate, the transmission rate "2 Gbps" is stored in advance in association with the bit rate of the video.

In the illustrated example, a value stored in the data item "video bit rate" of Row 101 is "3000" and a value stored in the data item "communication rate" is "4000." This means that a communication rate necessary for wirelessly transmitting a video signal with a video bit rate of "3000 Mbps" to the video receiver 20 is "4000 Mbps." Other rows are as illustrated. That is, Row 102 indicates that a communication rate necessary for wirelessly transmitting a video signal with a video bit rate of "1500 Mbps" to the video receiver 20 is "2000 Mbps." Also, Row 103 indicates that a communication rate necessary for wirelessly transmitting a video signal with a video bit rate of "750 Mbps" to the video receiver 20 is "1000 Mbps." When the bit rate of the video signal to be transmitted to the video receiver 20 is specified in this way, the communication rate necessary for wirelessly transmitting the video signal to the video receiver 20 can be uniquely specified.

Next, the minimum reception sensitivity table stored by the storage unit 23 of the video receiver 20 will be described. FIG. 5 is a schematic diagram illustrating a data structure of the minimum reception sensitivity table according to the present embodiment. The minimum reception sensitivity table has data items "communication rate" and "minimum reception sensitivity," and pieces of data of the data items are stored for each row in association therewith.

In the data item "communication rate," communication rates of the video signal transmitted by the video transmitter 10 are stored. In the data item "minimum reception sensitivity," minimum reception sensitivity with which the video signal wirelessly transmitted at the communication rate stored in the data item "communication rate" can be received is stored. A unit of the communication rate is "Mbps" and the unit of the minimum reception sensitivity is "dBm."

In the illustrated example, a value stored in the data item "communication rate" of Row 201 is "4000" and a value stored in the data item "minimum reception sensitivity" is "−65." This means that the minimum reception sensitivity with which the video signal wirelessly transmitted at the communication rate of "4000 Mbps" can be received is "−65 dBm." Other rows are as illustrated. That is, Row 202 indicates that the minimum reception sensitivity with which the video signal wirelessly transmitted at the communication rate of "2000 Mbps" can be received is "−70 dBm." Row 203 indicates that the minimum reception sensitivity with which the video signal wirelessly transmitted at the communication rate of "1000 Mbps" can be received is "−73 dBm." Also, Row 204 indicates that the minimum reception sensitivity with which the video signal wirelessly transmitted at the communication rate of "500 Mbps" can be received is "−76 dBm." When the bit rate of the video signal included in the wireless signal transmitted from the video transmitter 10 is specified in this way, the minimum reception sensitivity with which the wireless signal can be received can be uniquely specified.

Figure 6:
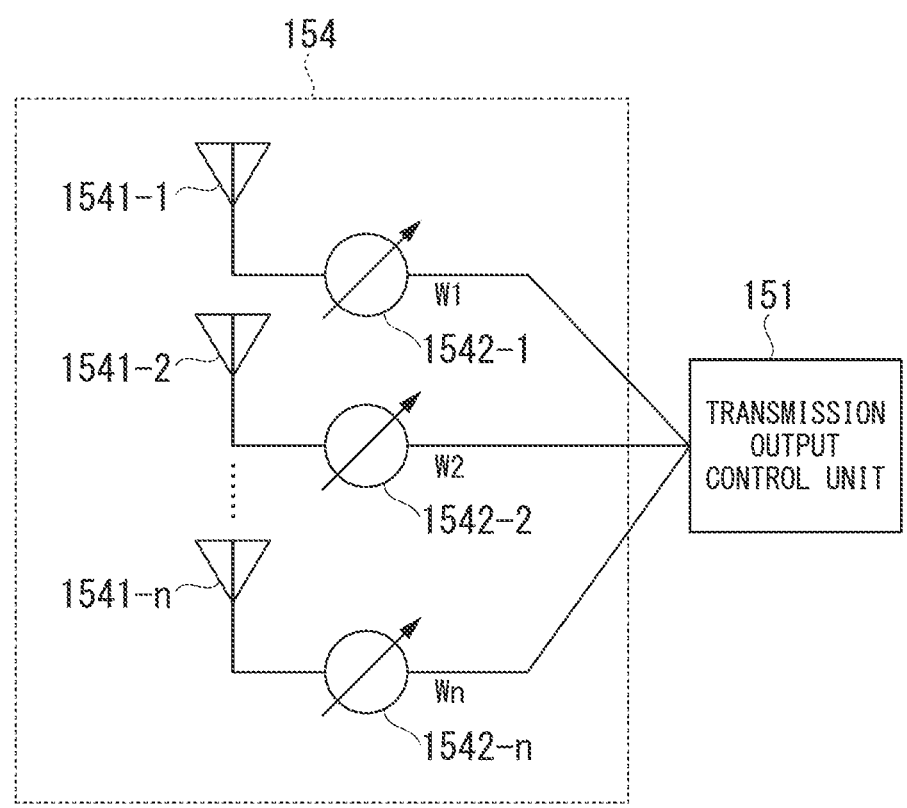
FIG. 6 is a schematic diagram illustrating the constitution of an antenna unit according to the first embodiment of the present invention.

Next, the constitution of the antenna unit 154 will be described. FIG. 6 is a schematic diagram illustrating the constitution of the antenna unit 154 according to the present embodiment. In the illustrated example, the antenna unit 154 includes n antenna elements 1541-1 to 1541-*n* and n weighting circuits 1542-1 to 1542-*n*. The weighting circuits 1542-1 to 1542-*n* control outputs of the antenna elements 1541-1 to 1541-*n* under the control of the transmission output control unit 151. Specifically, the weighting circuits 1542-1 to 1542-*n* change the signal outputs released by the antenna elements 1541-1 to 1541-*n* by controlling weights W1 to Wn of the signals input to the antennas. Since the transmission output control unit 151 can change directivity of the antenna elements 1541-1 to 1541-*n* in this way, the transmission output control unit 151 can control directivity obtained by synthesizing the outputs of the antenna elements 1541-1 to 1541-*n*.

FIG. 7 is a schematic diagram illustrating a relation between the directivity of the antenna unit 154 and a transmission output according to the present embodiment. FIG. 7(1) is a schematic diagram illustrating an antenna directivity form when the transmission output of the antenna unit 154 is high. FIG. 7(2) is a schematic diagram illustrating an antenna directivity form when the transmission output of the antenna unit 154 is low. As illustrated in FIG. 7(1), the transmission output can be set to be high by changing the antenna directivity so that the wireless signal is carried far. Also, as illustrated in FIG. 7(2), the transmission output can be set to be low by changing the antenna directivity so that the wireless signal is only carried nearby.

Next, an antenna gain suppression table stored by the storage unit 13 of the video transmitter 10 will be described. FIG. 8 is a schematic diagram illustrating a data structure of the antenna gain suppression table according to the present embodiment. The antenna gain suppression table has data items "S/N difference" and "suppression amount," and pieces of data of the data items are stored for each row in association therewith.

In the data item "S/N difference," a difference between the received radio wave intensity and the minimum reception sensitivity is stored. In the data item "suppression amount," a gain amount by which the output can be lowered is stored in the case of an S/N difference stored in the data item "S/N difference." A unit of the S/N difference is "dB" and a unit of the lowering amount is "dB." When the received radio wave intensity is greater than a predetermined value (second predetermined value) with respect to the minimum reception sensitivity, an influence of noise is scarcely received in spite of the fact that the transmission output is lowered. Therefore, in the antenna gain suppression table, an output value which can be lowered is stored in advance based on the predetermined value. The predetermined value may be determined in advance or any value may be set. For example, 6 dB is set as the predetermined value in the present embodiment.

In the illustrated example, a value stored in the data item "S/N difference" of Row 301 is "20" and a value stored in the data item "suppression amount" is "14." This means that the output can be lowered by 14 dB when the S/N difference is 20 dB. Other rows are as illustrated. When the S/N difference is specified in this way, the output amount which can be lowered can be uniquely specified.

Figure 9:
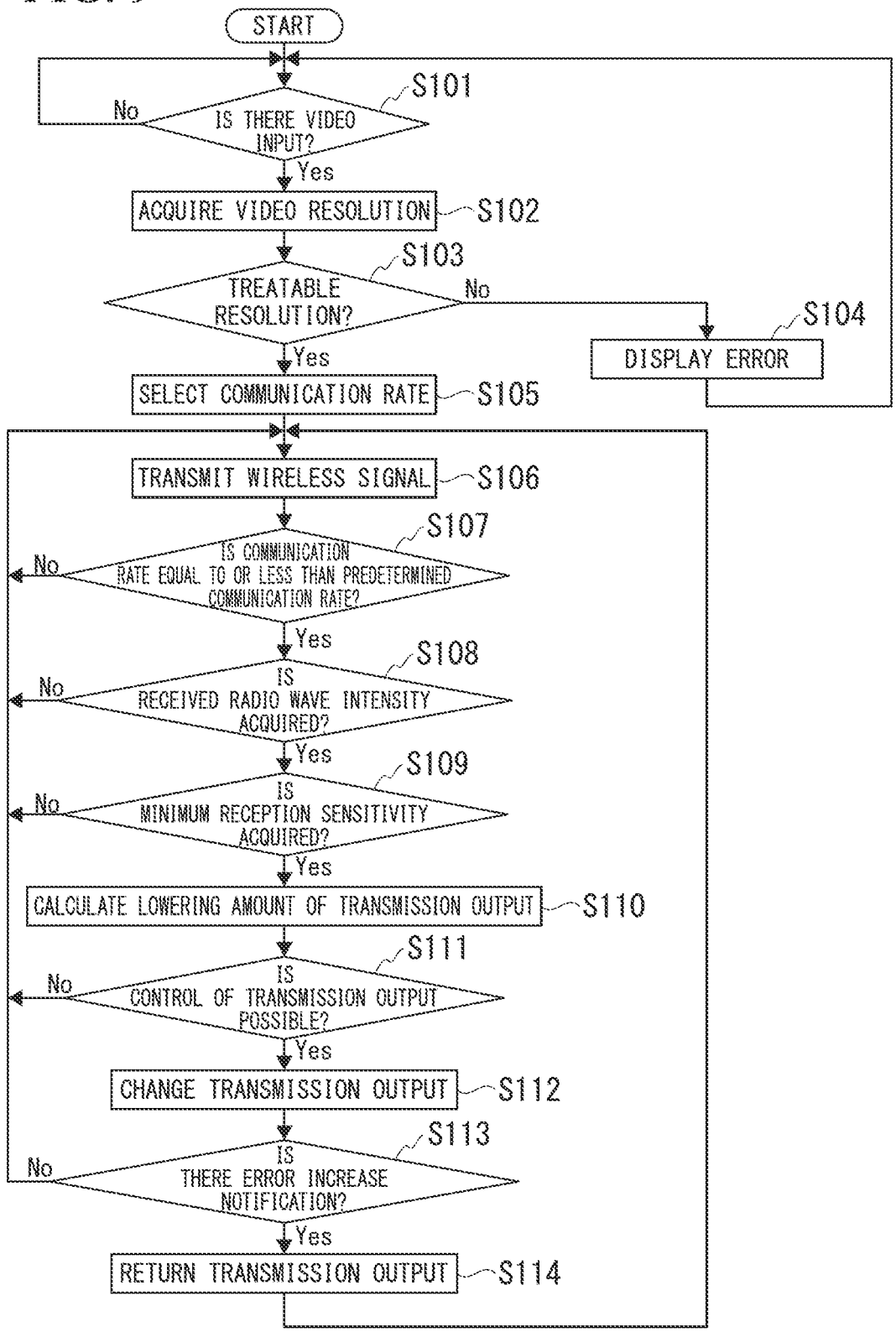
FIG. 9 is a flowchart illustrating an order in which the video transmitter wirelessly transmits a video signal to the video receiver according to the first embodiment of the present invention.

Next, an order in which the video transmitter 10 wirelessly transmits the video signal to the video receiver 20 will be described. FIG. 9 is a flowchart illustrating the order in which the video transmitter 10 wirelessly transmits the video signal to the video receiver 20 according to the present embodiment. In the present embodiment, essential steps are S102 (acquisition of a video resolution), S105 (selection of a communication rate), S106 (transmission of a video signal), S107 (determination of a rate equal to or less than a predetermined rate), S108 (acquisition of received radio wave intensity), S109 (acquisition of minimum reception sensitivity), S110 (calculation of a transmission output suppression amount), and S112 (change in a transmission output).

(Step S101) After establishment of communication with the video receiver 20, the video transmitter 10 waits for an input of a video signal. When the video signal is input, the video acquisition unit 11 acquires the video signal. The control unit 14 determines whether the video acquisition unit 11 acquires the video signal. When the video signal is acquired and the control unit 14 performs the determination, the process proceeds to the process of step S102. In other cases, the process of step S101 is performed again. When the video signal is input to the video transmitter 10, the video acquisition unit 11 constantly acquires the video signal until the end of the process.

(Step S102) The video resolution acquisition unit 121 acquires the resolution of the video signal acquired by the video acquisition unit 11. The resolution acquired by the video resolution acquisition unit 121 includes, for example, a screen size, a frame rate, and color information. Thereafter, the process proceeds to a process of step S103.

(Step S103) Based on the resolution of the video signal acquired in the process of step S102 by the video resolution acquisition unit 121, the control unit 14 determines whether the video signal is the video signal with a resolution which can be displayed by the video receiver 20. For example, the control unit 14 acquires extended display identification data (EDID) or the like from the video receiver 20 and determines whether the video receiver 20 can display the video signal based on the acquired EDID. When the control unit 14 determines that the video signal is the video signal with the resolution which can be displayed by the video receiver 20, the process proceeds to the process of step S105. In the other cases, the process proceeds to a process of step S104.

(Step S104) The control unit 14 causes the display unit 17 to display an error message. Thereafter, the process returns to the process of step S101.

(Step S105) The communication rate setting unit 141 selects a communication rate necessary for wirelessly transmitting the video signal acquired in the process of step S101 by the video acquisition unit 11 to the video receiver 20 based on the resolution of the video signal acquired in step S102 by the video resolution acquisition unit 121 and the communication rate table stored by the storage unit 13. Thereafter, the process proceeds to the process of step S106. For example, as illustrated in FIG. 5, when the bit rate of the video signal acquired in the process of step S101 by the video acquisition unit 11 is "3000 Mbps," the communication rate setting unit 141 selects "4000 Mbps" as the communication rate necessary for wirelessly transmitting the video signal to the video receiver 20.

(Step S106) The transmission unit 152 wirelessly transmits the video signal acquired by the video acquisition unit 11 to the video receiver 20 via the antenna unit 154. Thereafter, the process proceeds to the process of step S107.

(Step S107) The communication rate setting unit 141 determines whether the communication rate selected in the process of step S105 is equal to or less than a predetermined communication rate (first predetermined value) (for example, 1000 Mbps). When the communication rate setting unit 141 determines that the communication rate is equal to or less than the predetermined communication rate, the process proceeds to the process of step S108. In other cases, the process returns to the process of step S106. The predetermined communication rate may be determined in advance or any communication rate may be determined.

(Step S108) When received radio wave intensity information indicating a received radio wave intensity is transmitted from the video receiver 20, the reception unit 153 receives the received radio wave intensity information. The transmission output control unit 151 determines whether the reception unit 153 receives the received radio wave intensity information. When the transmission output control unit 151 determines that the received radio wave intensity information is received, the process proceeds to the process of step S109. In other cases, the process returns to the process of step S106.

(Step S109) When minimum reception sensitivity information indicating the minimum reception sensitivity is transmitted from the video receiver 20, the reception unit 153 receives the minimum reception sensitivity information. The transmission output control unit 151 determines whether the reception unit 153 receives the minimum reception sensitivity information. When the transmission output control unit 151 determines that the reception unit 153 receives the minimum reception sensitivity information, the process proceeds to the process of step S110. In other cases, the process returns to the process of step S106.

(Step S110) The transmission output control unit 151 calculates a suppression amount of the transmission output based on the received radio wave intensity information received in the process of step S108 by the reception unit 153 and the minimum reception sensitivity information received in the process of step S109 by the reception unit 153. Thereafter, the process proceeds to a process of step S111. A method of calculating the suppression amount of the transmission output has been described with reference to FIG. 8.

(Step S111) Based on the suppression amount of the transmission output calculated in the process of step S110, the transmission output control unit 151 determines whether the transmission output can be lowered. When the transmission output control unit 151 determines that the transmission output can be lowered, the process proceeds to a process of step S112. In other cases, the process returns to the process of step S106.

(Step S112) The transmission output control unit 151 changes the transmission output of the transmission unit 152 based on the suppression amount of the transmission output calculated in the process of step S110. Thereafter, the process proceeds to a process of step S113. The suppression amount of the transmission output calculated in the process of step S110 may not be lowered all at once, but may be gradually lowered. In the example illustrated in FIG. 8, the output can be lowered by 14 dB when there is a difference of 20 db. For example, when the output is lowered separately five times, the output is lowered by 3 dB at a time in stages up to the S/N difference of 6 dB which is the limit due to the fact that about 3 dB is obtained by dividing 14 dB by 5.

(Step S113) When an error increase notification indicating that a reception error increases is transmitted from the video receiver 20, the reception unit 153 receives the error increase notification. The transmission output control unit 151 determines whether the reception unit 153 receives the error increase notification. When the transmission output control unit 151 determines that the reception unit 153 receives the error increase notification, the process proceeds to a process of step S114. In other cases, the process returns to the process of step S106.

(Step S114) The transmission output control unit 151 returns the transmission output of the transmission unit 152 to the transmission output before the change in the process of step S112. Thereafter, the process returns to the process of step S106. When the transmission output is gradually lowered in step S112, the transmission output may be gradually returned.

Next, an order in which the video receiver 20 receives the video signal wirelessly transmitted from the video transmitter 10 will be described. FIG. 10 is a flowchart illustrating the order in which the video receiver 20 receives the video signal wirelessly transmitted from the video transmitter 10 according to the present embodiment.

(Step S201) After establishment of communication with the video transmitter 10, the video receiver 20 stands by until a wireless signal is transmitted from the video transmitter 10. When the wireless signal is wirelessly transmitted from the video transmitter 10, the reception unit 211 receives the wireless signal. The control unit 24 determines whether the reception unit 211 receives the wireless signal wirelessly transmitted from the video transmitter 10.

When the control unit 24 determines that the wireless signal is received, the process proceeds to a process of step S202. In other cases, the process of step S201 is performed again.

(Step S202) The received radio wave intensity acquisition unit 212 acquires the received radio wave intensity of the wireless signal transmitted from the video transmitter 10 based on the wireless signal received by the reception unit 211. Thereafter, the process proceeds to a process of step S203.

(Step S203) The communication rate acquisition unit 214 acquires the communication rate of the wireless signal based on a communication rate setting value (not illustrated) stored in a header portion of a received wireless signal packet. Thereafter, the process proceeds to a process of step S204.

(Step S204) The minimum reception sensitivity acquisition unit 213 acquires minimum reception sensitivity which is the minimum reception sensitivity with which the wireless signal can be received based on the communication rate of the wireless signal acquired in the process of step S203 by the communication rate acquisition unit 214 and the minimum reception sensitivity table stored by the storage unit 23. Thereafter, the process proceeds to a process of step S205. For example, as illustrated in FIG. 5, when the communication rate of the wireless signal acquired in the process of step S203 by the communication rate acquisition unit 214 is "4000 Mbps," the minimum reception sensitivity acquisition unit 213 acquires the minimum reception sensitivity of "−65 dBm" with which the wireless signal can be received.

(Step S205) The transmission unit 215 transmits, to the video transmitter 10, information indicating the received radio wave intensity acquired in the process of step S202 by the received radio wave intensity acquisition unit 212 and information indicating the minimum reception sensitivity acquired in the process of step S204 by the minimum reception sensitivity acquisition unit 213.

Thereafter, the process proceeds to a process of step S206. The transmission unit 215 preferably transmits the information indicating the received radio wave intensity and the information indicating the minimum reception sensitivity during a period in which the reception unit 211 receives no wireless signal. For example, the transmission unit 215 preferably transmits the information indicating the received radio wave intensity and the information indicating the minimum reception sensitivity during a vertical synchronization period of the video signal in which the received wireless signal is demodulated and generated.

(Step S206) The control unit 24 determines whether a reception error of the reception unit 211 increases. When the control unit 24 determines that the reception error of the reception unit 211 increases, the process proceeds to a process of step S207. In other cases, the process returns to the process of step S201.

(Step S207) The transmission unit 215 transmits an error increase notification to the video transmitter 10. Thereafter, the process returns to the process of step S201.

The control unit 24 of the video receiver 20 demodulates the wireless signal received by the reception unit 211 to generate the video signal. Thereafter, the video display control unit 251 processes the video signal generated by the control unit 24. The video output unit 26 outputs the video signal processed by the video display control unit 251.

According to the present embodiment as described above, the video transmitter 10 lowers an output level according to the resolution of the video signal to be transmitted with the wireless signal so that the output level is lower but is still equal to or greater than an output level by which the video receiver 20 can receive the wireless signal, and transmits the wireless signal. Thus, since the video transmitter 10 suppresses the transmission output of the wireless signal, it is possible to reduce interference occurring by a system wirelessly transmitting a video signal with a low resolution with respect to a system wirelessly transmitting a video signal with a high resolution.

Also, as described above, when a video signal with a high resolution and a high video bit rate is wirelessly transmitted, it is necessary to increase a communication rate, and therefore the control of the transmission output may not be performed in the video transmitter 10. On the other hand, when wireless communication of a video signal with a low resolution and a low video bit rate is performed, the communication rate can be set to be low, and therefore the control of the transmission output may be performed in the video transmitter 10.

When the video signal is a video signal compressed by MPEG or the like, the communication rate can be set to be low due to the fact that the bit rate is lowered by compression even when an image size or a frame rate is high. Therefore, the video transmitter 10 can lower the output level and wirelessly transmit the compressed video signal to the video receiver 20. Accordingly, in a system wirelessly transmitting a video signal with a high resolution, it is possible to reduce occurrence of interference.

Also, in the present embodiment, the video receiver 20 transmits the received radio wave intensity value and the minimum reception sensitivity value to the video transmitter 10, and the video transmitter 10 specifies the suppression amount of the transmission output based on the received radio wave intensity value and the minimum reception sensitivity value, but embodiments of the present invention are not limited to this constitution. For example, the video receiver 20 may specify the suppression amount based on the received radio wave intensity value and the minimum reception sensitivity value and transmit the specified suppression amount to the video transmitter 10. By realizing this constitution, it is possible to reduce a processing load of the video transmitter 10.

The method of changing the transmission output may be realized by suppressing a signal amplitude to be supplied to each of the antenna elements 1541-1 to 1541-*n* included in the antenna unit 154. Also, the method of changing the transmission output may be realized by interrupting power of a power amplifier connected to each of the antenna elements 1541-1 to 1541-*n* included in the antenna unit 154. When the transmission output is changed by suppressing the signal amplitude, one antenna element may be provided as the antenna elements 1541-1 to 1541-*n* included in the antenna unit 154. Also, when the transmission output is changed by interrupting the power of the power amplifier, two antenna elements may be provided as the antenna elements 1541-1 to 1541-*n* included in the antenna unit 154.

Second Embodiment

Hereinafter, a second embodiment of the present invention will be described with reference to the drawings. A difference between the present embodiment and the first embodiment is that a transmission output of a wireless signal for transmitting a control signal is also controlled in addition to the control of the transmission output of the wireless signal for transmitting the video signal in the present embodiment. In general, the control signal has less data than the video signal and a sufficiently low transmission rate. Accordingly, even when the transmission output of the wireless signal for transmitting the control signal is set to be even less compared to the transmission output of the wireless signal for transmitting the video signal, a video transmitter 10 can transmit the control signal to the video receiver 20 without receiving the influence of noise.

The constitution of a video transceiver system 1 according to the present embodiment is the same as the constitution of the video transceiver system 1 according to the first embodiment. Also, the constitution of the video transmitter 10 according to the present embodiment is the same as the constitution of the video transmitter 10 according to the first embodiment. Also, the constitution of the video receiver 20 according to the present embodiment is the same as the constitution of the video receiver 20 according to the first embodiment.

Next, a minimum reception sensitivity table of the control signal stored by the storage unit 23 of the video receiver 20 will be described. FIG. 11 is a schematic diagram illustrating a data structure of the minimum reception sensitivity table of the control signal according to the present embodiment. The minimum reception sensitivity table of the control signal has data items "communication rate" and "minimum reception sensitivity," and pieces of data of the data items are stored for each row in association therewith.

In the data item "communication rate," communication rates of the control signal transmitted by the video transmitter 10 are stored. In the data item "minimum reception sensitivity," minimum reception sensitivity with which the control signal wirelessly transmitted at the communication rate stored in the data item "communication rate" can be received is stored. A unit of the communication rate is "Mbps" and the unit of the minimum reception sensitivity is "dBm."

In the illustrated example, a value stored in the data item "communication rate" of Row 401 is "20" and a value stored in the data item "minimum reception sensitivity" is "−76." This means that the minimum reception sensitivity with which the control signal transmitted at the communication rate of "20 Mbps" can be wirelessly received is "−76 dBm." Other rows are as illustrated. That is, Row 402 indicates that the minimum reception sensitivity with which the control signal transmitted at the communication rate of "10 Mbps" can be wirelessly received is "−85 dBm." Row 403 indicates that the minimum reception sensitivity with which the video signal transmitted at the communication rate of "5 Mbps" can be wirelessly received is "−88 dBm." When the communication rate of the control signal included in the wireless signal transmitted from the video transmitter 10 is specified in this way, the minimum reception sensitivity with which the control signal can be wirelessly received can be uniquely specified.

An order in which the video transmitter 10 wirelessly transmits the control signal to the video receiver 20 is the same as the order (the order illustrated in FIG. 9) in which the video transmitter 10 wirelessly transmits the video signal to the video receiver 20. Also, an order in which the video receiver 20 receives the control signal wirelessly transmitted from the video transmitter 10 is the same as the order (the order illustrated in FIG. 10) in which the video receiver 20 receives the video signal wirelessly transmitted from the video transmitter 10.

As described above, since the storage unit 23 of the video receiver 20 stores the minimum reception sensitivity table of the control signal, the video transmitter 10 can separately set an output value of the wireless signal for transmitting the video signal and an output value of the wireless signal for transmitting the control signal. Thus, the interference of the control signal can also be reduced.

Third Embodiment

Hereinafter, a third embodiment of the present invention will be described with reference to the drawings. A difference between the present embodiment and the first embodiment is that not only is the interference suppressed by changing the transmission output but an arrival method of an interference wave is also estimated and interference is suppressed by null steering in the present embodiment. A video transceiver system 2 according to the present embodiment includes a video transmitter 30 and a video receiver 40. As in the video transceiver system 1 according to the first embodiment, the video transmitter 30 acquires a video signal and transmits the acquired video signal to the video receiver 40 which is a connection target. The video receiver 40 displays a video based on the transmitted video signal on a monitor or the like. Wireless communication is performed in a communication path between the video transmitter 30 and the video receiver 40.

Figure 12:
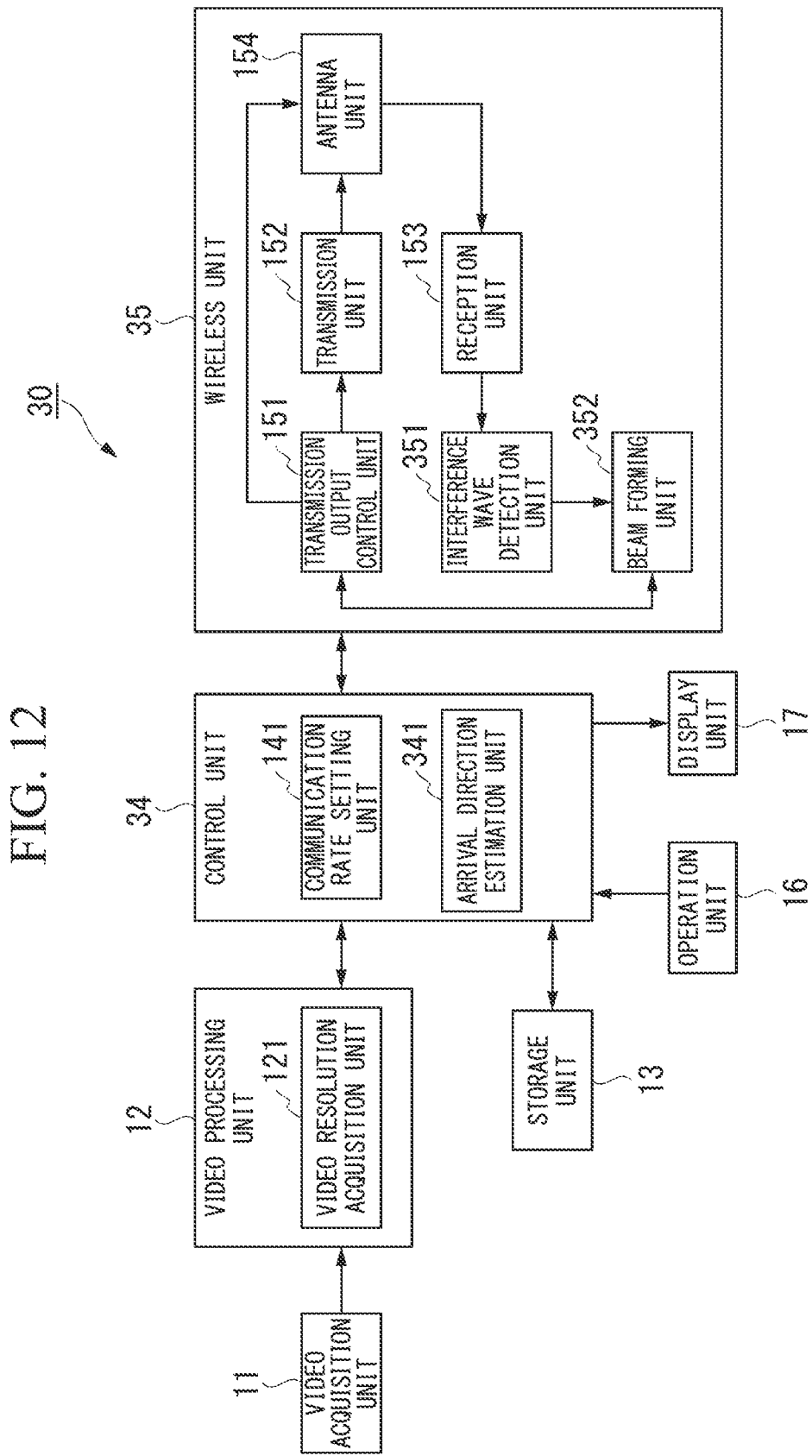
FIG. 12 is a block diagram illustrating the constitution of a video transmitter according to a third embodiment of the present invention.

Next, the constitution of the video transmitter 30 will be described. FIG. 12 is a block diagram illustrating the constitution of the video transmitter 30 according to the present embodiment. In the illustrated example, the video transmitter 30 includes a video acquisition unit 11, a video processing unit 12, a storage unit 13, a control unit 34, a wireless unit 35 (wireless communication unit), an operation unit 16, and a display unit 17. Also, the video processing unit 12 includes a video resolution acquisition unit 121. Also, the control unit 34 includes a communication rate setting unit 141 and an arrival direction estimation unit 341. Also, the wireless unit 35 includes a transmission output control unit 151, a transmission unit 152, a reception unit 153, an antenna unit 154, an interference wave detection unit 351, and a beam forming unit 352.

The video acquisition unit 11, the video processing unit 12, the storage unit 13, the operation unit 16, and the display unit 17 are the same as those units of the first embodiment. The control nit 34 controls each of the units of the video transmitter 30. The communication rate setting unit 141 sets a communication rate when a video signal is wirelessly transmitted to the video receiver 40. The arrival direction estimation unit 341 estimates a direction in which a radio wave detected by the interference wave detection unit 351 is transmitted. For example, the arrival direction estimation unit 341 estimates an incident direction of an interference wave by a beam former method or an algorithm such as MUSIC with higher reliability.

The wireless unit 35 transmits and receives a video signal, a control signal, and the like to and from the video receiver 40 by establishing connection of wireless communication. The transmission output control unit 151 controls a transmission output of the transmission unit 152. The transmission unit 152 transmits a wireless signal to the video receiver 40. The reception unit 153 receives a wireless signal transmitted from the video receiver 40. The antenna unit 154 is an adaptive array antenna using a plurality of antennas. The interference wave detection unit 351 detects radio waves transmitted from an apparatus (an apparatus other than the video receiver communicating with the video transmitter) other than a desired communication target. The beam forming unit 352 performs null steering. The null steering is a technology, such as a minimum mean square error (MMSE) method or a maximum SNR (MSN) method, for reducing an influence of an interference wave from the outside by automatically facing a null point of a directivity pattern in an interference direction.

Figure 13:
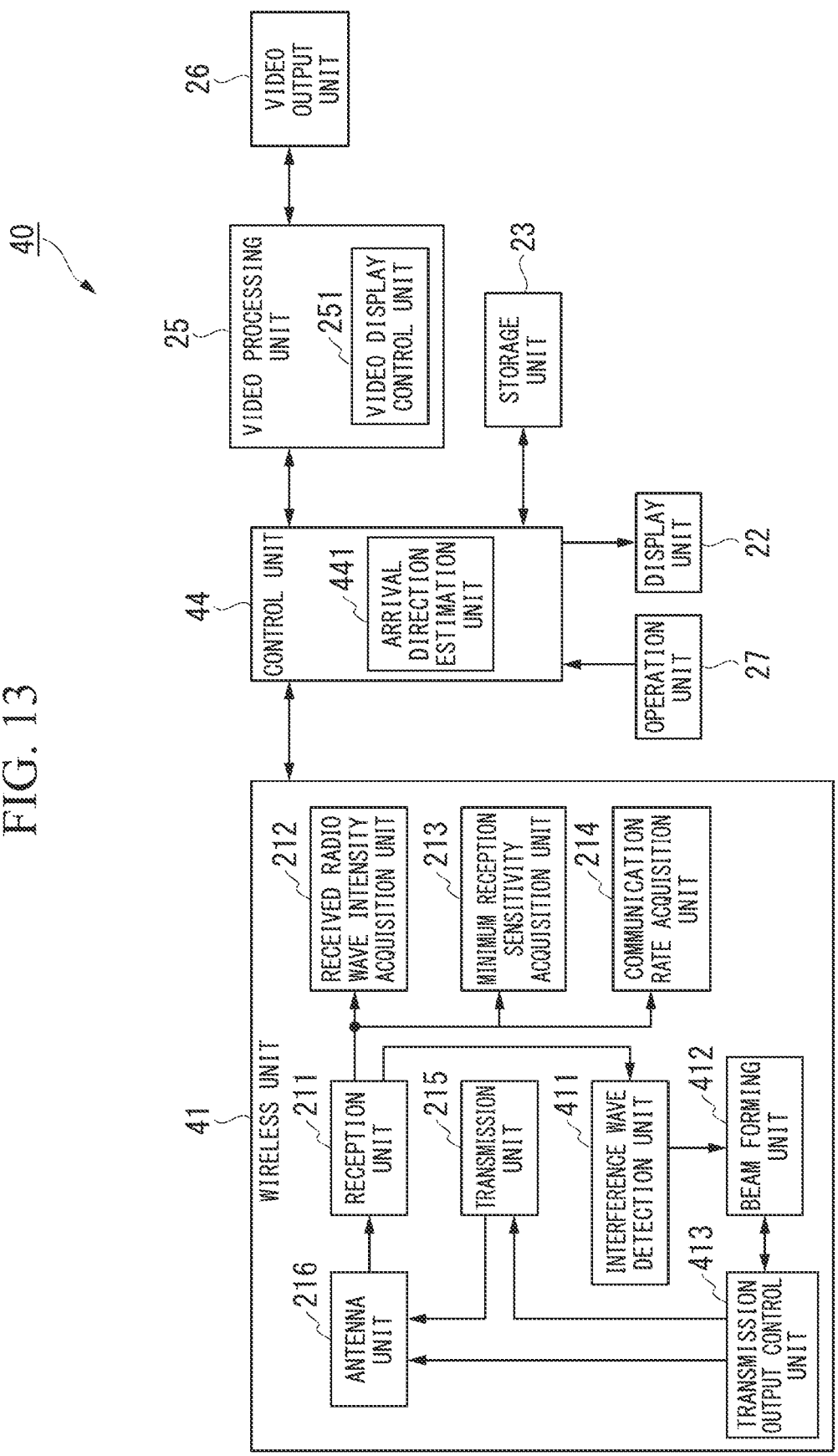
FIG. 13 is a block diagram illustrating the constitution of a video receiver according to the third embodiment of the present invention.

Next, the constitution of the video receiver 40 will be described. FIG. 13 is a block diagram illustrating the constitution of the video receiver 40 according to the present embodiment. In the illustrated example, the video receiver 40 includes a wireless unit 41, a display unit 22, a storage unit 23, a control unit 44, a video processing unit 25, a video output unit 26, and an operation unit 27. Also, the wireless unit 41 includes a reception unit 211, a received radio wave intensity acquisition unit 212, a minimum reception sensitivity acquisition unit 213, a communication rate acquisition unit 214, a transmission unit 215, an antenna unit 216, an interference wave detection unit 411, a beam forming unit 412, and a transmission output control unit 413. Also, the video processing unit 25 includes a video display control unit 251. Also, the control unit 44 includes an arrival direction estimation unit 441.

The display unit 22, the storage unit 23, the video processing unit 25, the video output unit 26, and the operation unit 27 are the same as those units of the first embodiment. The wireless unit 41 transmits and receives a video signal, a control signal, and the like to and from the video transmitter 30 by establishing connection of wireless communication.

The reception unit 211, the received radio wave intensity acquisition unit 212, the minimum reception sensitivity acquisition unit 213, the communication rate acquisition unit 214, the transmission unit 215, and the antenna unit 216 are the same as those units of the first embodiment.

The interference wave detection unit 411 detects radio waves transmitted from an apparatus (an apparatus other than the video transmitter communicating with the video receiver) other than a desired communication target. The beam forming unit 412 performs the null steering. The transmission output control unit 413 controls a transmission output of the transmission unit 215. The control unit 44 controls each of the units included in the video receiver 40. The arrival direction estimation unit 441 estimates a direction in which the radio waves detected by the interference wave detection unit 411 are transmitted.

Figure 14:
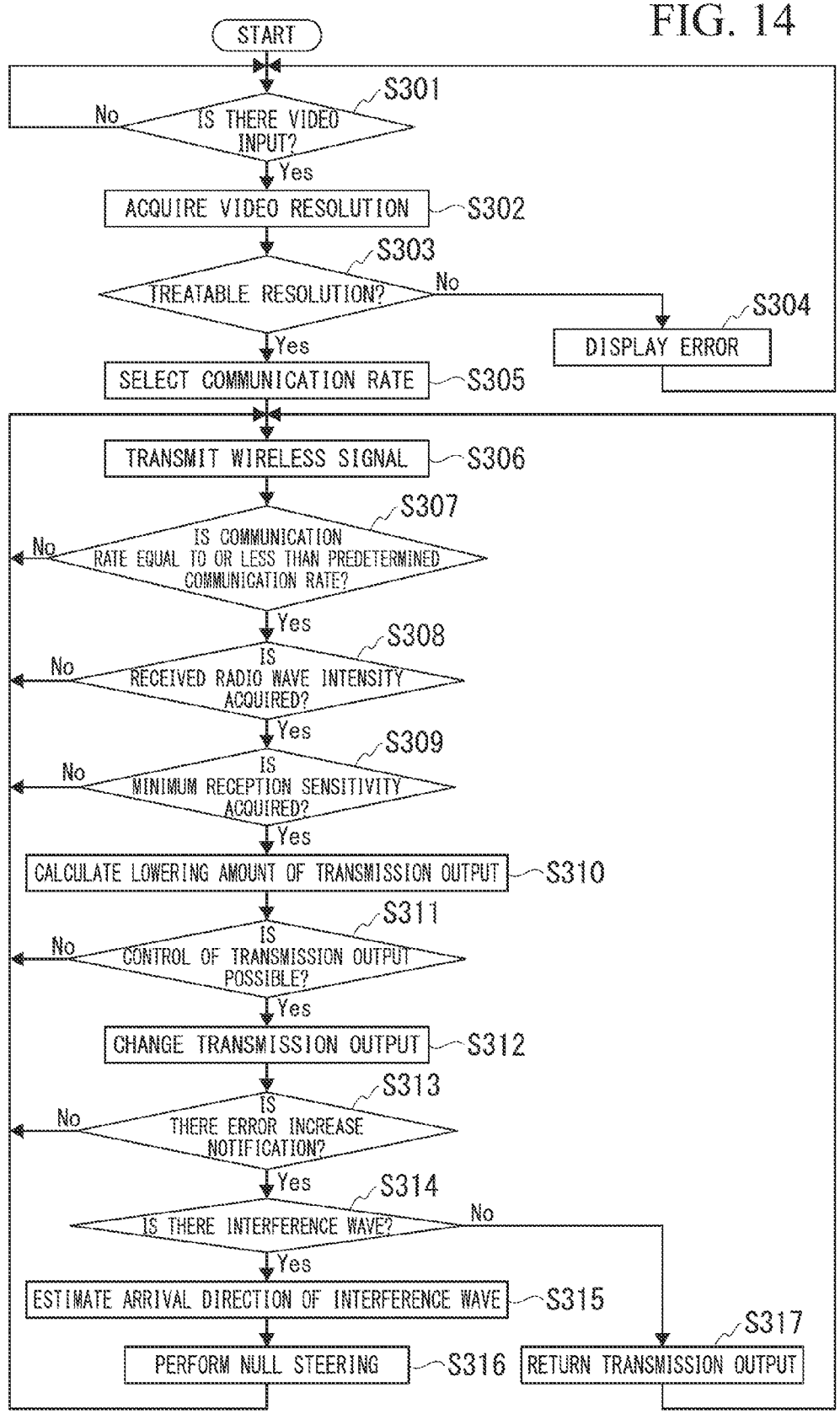
FIG. 14 is a flowchart illustrating an order in which the video transmitter wirelessly transmits a video signal to the video receiver according to the third embodiment of the present invention.
Figure 15:
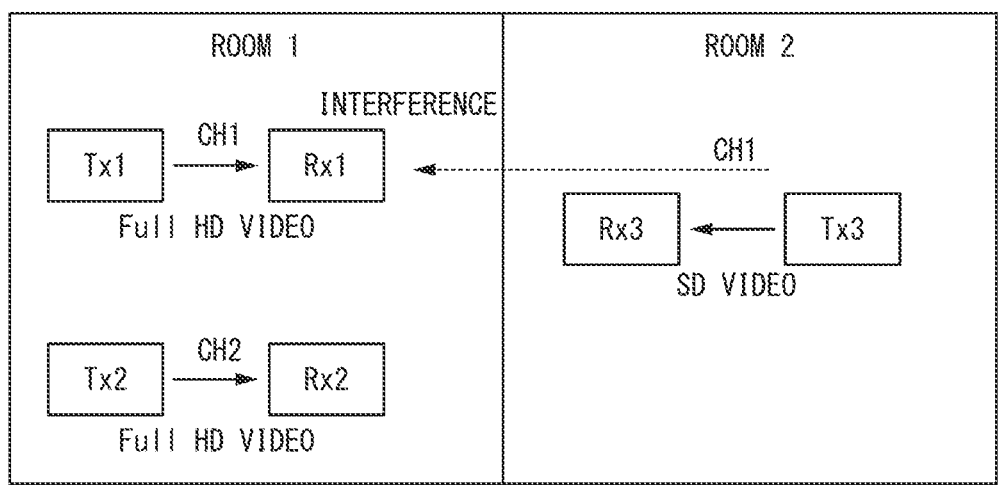
FIG. 15 is a schematic diagram illustrating the constitution of wireless communication systems in adjacent rooms.

Next, an order in which the video transmitter 30 wirelessly transmits a video signal to the video receiver 40 will be described. FIG. 14 is a flowchart illustrating the order in which the video transmitter 30 wirelessly transmits a video signal to the video receiver 40 according to the present embodiment.

Processes of step S301 to step S313 are the same as the processes of step S101 to step 113 of the first embodiments.

(Step S314) The interference wave detection unit 351 detects an interference wave transmitted from another apparatus and determines whether there is the interference wave. When the interference wave detection unit 351 determines that there is the interference wave transmitted from the other apparatus, the process proceeds to a process of step S315. In other cases, the process proceeds to a process of step S317.

(Step S315) The arrival direction estimation unit 341 estimates an arrival direction of the interference wave based on the interference wave detected in the process of step S314 by the interference wave detection unit 351. Thereafter, the process proceeds to a process of step S316.

(Step S316) The beam forming unit 352 suppresses the influence of the interference wave by the null steering based on the arrival direction of the interference wave estimated in the process of step S315 by the arrival direction estimation unit 341. Thereafter, the process returns to the process of step S306.

(Step S317) The transmission output control unit 151 returns the transmission output of the transmission unit 152 to the transmission output before the change in the process of step S312. Thereafter, the process returns to the process of step S306.

Next, an order in which the video receiver 40 receives the video signal wirelessly transmitted from the video transmitter 30 will be described. The order in which the video receiver 40 receives the video signal wirelessly transmitted from the video transmitter 30 is the same as the order in which the video receiver 20 receives the video signal wirelessly transmitted from the video transmitter 10 in the first embodiment.

In the present embodiment, as described above, the video transmitter 30 suppresses the interference by changing the transmission output, and also suppresses the interference through the null steering by estimating the arrival direction of the interference wave. Thus, the interference to another apparatus can be further reduced and the interference received from another apparatus can be further reduced.

All or some of the functions of the units of the video transmitters 10 and 30 and all or some of the functions of the units of the video receivers 20 and 40 in the above-described embodiments may be realized by recording a program for realizing these functions in a computer-readable recording medium, causing a computer system to read the program recorded in the recording medium, and executing the program. The "computer system" mentioned here includes an OS and hardware such as peripheral devices.

Also, the "computer-readable recording medium" refers to a portable medium such as a flexible disk, a magneto-optical disc, a ROM, or a CD-ROM and a storage unit such as a hard disk included inside a computer system. Further, the "computer-readable recording medium" may include one that retains a program dynamically for a short time, as in a communication circuit when a program is transmitted via a network such as the Internet or a communication line such as a telephone line, and one that retains a program for a given time, as in a volatile memory inside a computer system serving as a server or a client in this case. Also, the foregoing program may be a program for realizing some of the above-described functions or may be a program for realizing the above-described functions in combination with a program already recorded in a computer system.

The first to third embodiments of the present invention have been described above in detail with reference to the drawings, but specific constitutions are not limited to the embodiments and designs or the like are also included without departing from the gist of the present invention.

A wireless transmission output of a wireless communication unit can be suppressed while maintaining a transmission output according to the resolution of a video signal to be transmitted, and thus it is possible to realize application to a video transmitter, a video transmission method, and a program capable of further reducing radio wave interference with another apparatus.

What is claimed is:

1. A video transmitter comprising:
a video resolution acquisition unit configured to acquire a resolution of a video signal;
a wireless communication unit including an antenna, the wireless communication unit wirelessly transmitting the video signal and wirelessly receiving, from a terminal, which wirelessly receives a video signal that has been wirelessly transmitted, a received radio wave intensity and a minimum reception sensitivity at a time when wirelessly receiving the video signal; and
a communication rate setting unit configured to set a communication rate at a time when wirelessly transmitting the video signal according to the resolution of the video signal that has been acquired,
wherein the wireless communication unit includes a transmission output control unit, the transmission output control unit controlling the wireless communication unit to wirelessly transmit the video signal at the communication rate that has been set by the communication rate setting unit,
the transmission output control unit controlling a wireless transmission output of the wireless communication unit to suppress a difference between the radio wave intensity, which has been received, and the minimum reception sensitivity, which has been wirelessly received by the wireless communication unit, when the set communication rate is less than a first predetermined value and the difference is equal to or greater than a second predetermined value.

2. The video transmitter according to claim 1, wherein the transmission output control unit suppresses the wireless transmission output by changing directivity of the antenna.

3. The video transmitter according to claim 1, wherein the transmission output control unit suppresses the wireless transmission output by controlling a signal level supplied to the antenna.

4. The video transmitter according to claim 1, further comprising:
   an interference wave detection unit configured to detect whether there is an interference wave interfering with wireless communication with the terminal;
   an arrival direction estimation unit configured to estimate an arrival direction of the interference wave detected by the interference wave detection unit; and
   a beam forming unit configured to form a null point of directivity of the antenna in the arrival direction estimated by the arrival direction estimation unit.

5. The video transmitter according to claim 1, wherein the transmission output control unit suppresses the wireless transmission output during a vertical synchronization period of the wirelessly transmitted video signal.

6. The video transmitter according to claim 1, wherein the transmission output control unit suppresses the wireless transmission output at a time of wireless transmission of a control signal.

7. The video transmitter according to claim 6,
   wherein the antenna is an array antenna, and
   wherein the transmission output control unit suppresses the wireless transmission output at a time of wireless transmission of a signal regarding control of the array antenna to the terminal.

8. A video transmission method comprising:
   a video resolution acquisition step of acquiring a resolution of a video signal;
   a wireless communication step of wirelessly transmitting the video signal and wirelessly receiving, from a terminal having wirelessly received the wirelessly transmitted video signal, a received radio wave intensity and minimum reception sensitivity at a time of the wireless reception of the video signal;
   a communication rate setting step of setting a communication rate at a time of the wireless transmission of the video signal according to the acquired resolution of the video signal; and
   a transmission output control step of performing control such that a wireless communication unit wirelessly transmits the video signal at the communication rate set in the communication rate setting step and performing control such that a wireless transmission output of the wireless communication unit is suppressed to suppress a difference between the received radio wave intensity and the minimum reception sensitivity wirelessly received in the wireless communication step when the set communication rate is less than a first predetermined value and the difference is equal to or greater than a second predetermined value.

9. A non-transitory computer readable medium containing instructions which cause a computer to perform:
   a video resolution acquisition step of acquiring a resolution of a video signal;
   a wireless communication step of wirelessly transmitting the video signal and wirelessly receiving, from a terminal having wirelessly received the wirelessly transmitted video signal, a received radio wave intensity and minimum reception sensitivity at a time of the wireless reception of the video signal;
   a communication rate setting step of setting a communication rate at a time of the wireless transmission of the video signal according to the acquired resolution of the video signal; and
   a transmission output control step of performing control such that a wireless communication unit wirelessly transmits the video signal at the communication rate set in the communication rate setting step and performing control such that a wireless transmission output of the wireless communication unit is suppressed to suppress a difference between the received radio wave intensity and the minimum reception sensitivity wirelessly received in the wireless communication step when the set communication rate is less than a first predetermined value and the difference is equal to or greater than a second predetermined value.

* * * * *